Jan. 11, 1955 M. MENNESSON 2,699,228
CABLE OPERATED BRAKE FOR BICYCLES AND SIMILAR VEHICLES
Filed May 5, 1952

INVENTOR
MARCEL MENNESSON
BY
Bailey, Stephens & Huettig
ATTORNEYS

United States Patent Office 2,699,228
Patented Jan. 11, 1955

2,699,228

CABLE OPERATED BRAKE FOR BICYCLES AND SIMILAR VEHICLES

Marcel Mennesson, Neuilly-sur-Seine, France, assignor to Societe d'Appareils de Controle et d'Equipement des Moteurs (S. A. C. E. M.), S. A. R. L., Neuilly-sur-Seine (Seine), France, a society of France Application May 5, 1952, Serial No. 286,139

Claims priority, application France May 21, 1951

1 Claim. (Cl. 188—24)

The present invention relates to cable operated brakes for bicycles and similar vehicles.

These brakes act on the sides of the wheel rim through blocks, generally rubber blocks, which must be given a thickness such that it is not necessary to change them too often, despite the fact that they undergo considerable wear.

On the other hand, in order to achieve a good operation of the brake, their displacement to bring them from their position of rest to their working position in contact with the wheel rim must be small as compared with the corresponding displacement of the part, generally a hand lever, by means of which they are controlled.

It is therefore a necessity to readjust the brake at relatively short time intervals, as the blocks get more and more worn, by shortening the portion of the control cable which projects from the sheath which surrounds this cable.

The adjusting means provided up to this time were not satisfactory, in particular due to their complication and to their unreliability.

On the other hand, the diameter of the tire fitted on the rim is generally greater than the width of this rim. Consequently, when it is desired to remove the wheel from the bicycle frame without having to deflate the tire, it is necessary to move the brake blocks away from each other to a distance substantially greater than the distance at which they are normally located from each other. It is therefore advantageous to be able to do this without difficulty and subsequently to readjust the brake quickly so that the blocks are again at the proper distance from each other.

The object of the present invention is to provide a brake which complies with the above stated requirements.

For this purpose, I make use of a brake including, for securing at least one of the ends of the control cable to the brake element to which said cable end is to be fixed, a cable adjusting drum adapted to be rotated about its axis with respect to said element, and, according to my invention, this drum is mounted to be able to occupy, under the action of a control member, either of two positions with respect to said element, by displacement of said drum along its axis, means being provided to prevent rotation of said drum about said axis in at least one direction when it is in one of said positions, whereas in the other position the drum can be rotated freely with respect to said element by means of the same element, to make it possible to adjust the length of the control cable, a spring being provided to urge the drum toward the first mentioned position with respect to said element.

A preferred embodiment of the present invention will be hereinafter described with reference to the accompanying drawing, given merely by way of example, and in which.

Figure 1:
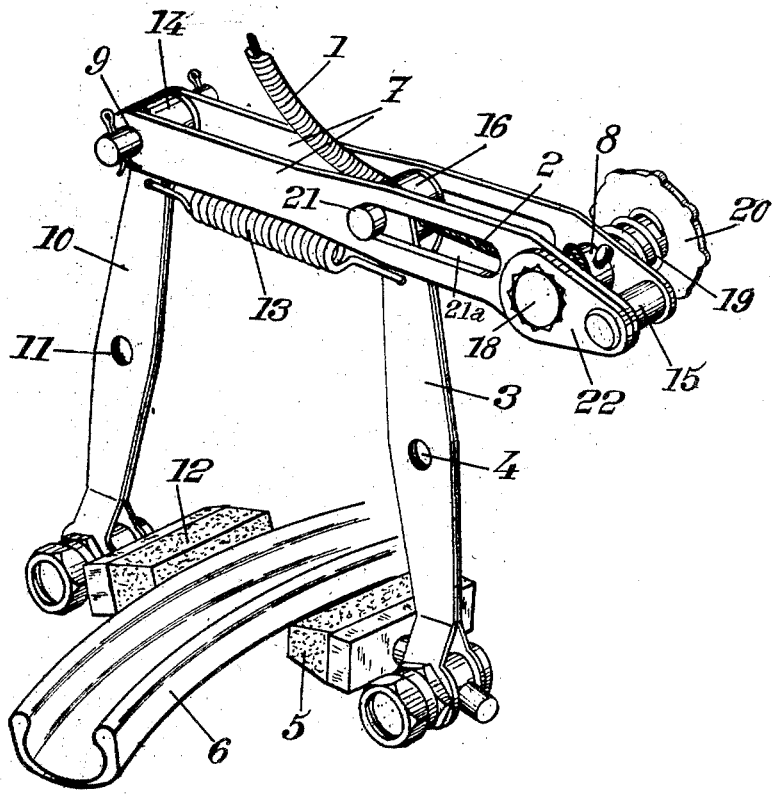
Fig. 1 is a perspective view of a bicycle brake according to my invention.

The brake shown by the drawing includes two rubber blocks 5 and 12 adapted to bear against the wheel rim 6. These blocks are carried respectively by the lower ends of two levers 3 and 10 pivoted about spindles, rigid with the bicycle frame (and not shown), engaged in holes 4 and 11 provided in said levers.

The top ends of levers 3 and 10 are forked and between the branches of these forked ends are fitted tubular members 16 and 14 respectively.

The top end of lever 10, together with its member 14, fits between the ends of two parallel plates 7 extending in a direction transverse to the plane of the wheel, lever 10 and member 14 being pivoted to said plates by means of a spindle 9. The other ends of said plates 7 are held at fixed distance from each other by a pin 15.

The top end of lever 3, together with its member 16, fits slidably between plates 7. A pin 21, extending axially through member 16 and the branches of the forked end of lever 3, is guided in a slot 21a provided in each of these plates 7.

A spring 13 urges the top ends of levers 3 and 10 toward each other.

The sheath 1 of the control cable 2 has one of its ends applied against member 16. The corresponding end of cable 2 extends through a hole provided in said member 16 and is fixed to a drum 8 extending across plates 7. The fixation of this end of cable 2 to drum 8 is obtained merely by slipping said cable through a hole 17 extending transversely through said drum and winding said cable around said drum. As the cable is constantly pulled, there is no risk of unwinding thereof and its friction on the drum is such that there is no slipping of the cable on the drum.

The other ends of said sheath and said cable respectively are fixed to two brake control elements to be moved with respect to each other by the cyclist to operate the brake. For instance the other end of sheath 1 is fixed to the handlebar and the other end of cable 2 is fixed to the brake actuating lever pivoted to said handlebar. When the actuating lever is pivoted, it pulls the cable end fixed thereto from this last mentioned end of sheath 1 so that the cable end fixed to drum 8 is pulled toward the sheath end fixed to member 16, so that parts 8 and 16 are drawn toward each other.

Figure 2:
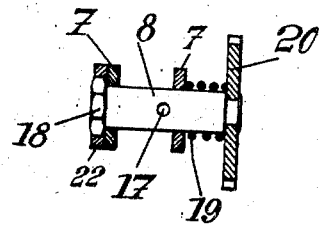
Fig. 2 is a cross section of a portion of this brake.

Drum 8 is journalled in plates 7 but normally cannot rotate about its axis with respect to said plates because the left-hand end of drum 8 (Fig. 2) carries, either rigid or integral therewith, a nut-shaped extension 18 fitting in a housing provided in a plate 22 fixed on the outer side of one of the plates 7, a spring 19 interposed between the outer side of the other plate 7 and a hand disc 20 rigid with the right-hand end of drum 8 urging said drum toward the right, i. e. tending to engage nut-shaped extension 18 into the housing of plate 22.

Part 18 has a hexagonal outline and the housing provided for said part in plate 22 has an outline obtained by superposing two hexagonal holes of the same size and the same center but the corresponding respective sides of which make an angle of 30° with each other. Thus, part 18 may fit in this housing in any of twelve different positions making each an angle of 30° with the next one.

When it is desired to modify the adjustment of the brake blocks 5, 12, for instance to bring them nearer to each other in order to compensate for their wear, it suffices to take hold of disc 20 and to push it, against the thrust of spring 19, toward plates 7 so as to disengage part 18 from its housing in plate 22. Drum 8 is then free to rotate in either direction about its axis and cable 2 can therefore be wound up on said drum by rotating disc 20 until blocks 5 and 12 have been brought into the desired position. Disc 20 is then released and under the action of spring 19 drum 8 moves toward the right and part 18 engages the housing of plate 22, where it is held at least substantially in the new position it has been given.

If, now, it is desired to move blocks 5 and 12 away from rim 6 in order to make it possible to remove the wheel without deflating its tire, it suffices, after pushing disc 20, to disengage part 18 from its housing in plate 22, to let this disc and drum 8 free to rotate under the action of spring 13 transmitted through cable 2. Levers 3 and 10 are pivoted about their axes 4 and 11 until pin 21 comes to the end of slot 21a. In this position of the parts, blocks 5 and 12 are at a distance from each other such that the inflated tire can be passed between them.

When the wheel has been replaced in the bicycle frame, adjustment of the brake is effected as above described.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

In a cable operated brake having an element which is movable by pulling of said cable but prevented from moving in a direction transverse to said cable, means for adjustably fixing the cable to the element comprising, in combination, a drum provided with a hole extending therethrough to receive the end of said cable, whereby said cable end can be fixed with respect to the periphery of said drum by winding said cable at least over one turn about said drum, said drum being both rotatable and slidable in said element about an axis transverse to the direction of said cable, a nut-shaped extension carried by said drum, a plate carried by said element provided with a housing arranged to receive said nut-shaped extension of the drum for one axial position thereof, the outline of said housing including a plurality of faces adapted to cooperate with the faces of said nut-shaped extension to lock it in any of a plurality of angular positions about its axis, spring means interposed between said element and said drum for urging said drum toward said axial position, and a hand control member carried by said drum for imparting thereto both axial and rotary displacements with respect to said element.

References Cited in the file of this patent

UNITED STATES PATENTS

| | | |
|---|---|---|
| 381,100 | Beath | Apr. 17, 1888 |
| 577,754 | Jackson | Feb. 23, 1897 |
| 1,153,093 | McFadden | Sept. 7, 1915 |

FOREIGN PATENTS

| | | |
|---|---|---|
| 540,628 | Great Britain | Oct. 23, 1941 |
| 605,576 | France | May 28, 1926 |
| 641,501 | France | Apr. 21, 1928 |
| 979,250 | France | Apr. 24, 1951 |
| 980,818 | France | May 18, 1951 |